United States Patent
Takeda

(10) Patent No.: US 10,158,782 B2
(45) Date of Patent: Dec. 18, 2018

(54) DATA PROCESSING APPARATUS AND IMAGE FORMING APPARATUS HAVING SHIFT REGISTER FOR PARALLEL AND SERIAL SIGNAL CONVERSIONS

(71) Applicant: CANON KABUSHIKI KAISHA, Tokyo (JP)

(72) Inventor: Shoji Takeda, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/591,551

(22) Filed: May 10, 2017

(65) Prior Publication Data

US 2017/0331973 A1    Nov. 16, 2017

(30) Foreign Application Priority Data

May 13, 2016  (JP) .................................. 2016-097160

(51) Int. Cl.
| | |
|---|---|
| *H04N 1/29* | (2006.01) |
| *G03G 15/00* | (2006.01) |
| *H04N 1/193* | (2006.01) |
| *H04N 1/028* | (2006.01) |
| *H04N 1/053* | (2006.01) |

(52) U.S. Cl.
CPC ......... *H04N 1/295* (2013.01); *G03G 15/5016* (2013.01); *H04N 1/02815* (2013.01); *H04N 1/053* (2013.01); *H04N 1/1937* (2013.01); *H04N 2201/0091* (2013.01); *H04N 2201/04782* (2013.01); *H04N 2201/04791* (2013.01)

(58) Field of Classification Search
CPC combination set(s) only.
See application file for complete search history.

(56) References Cited

FOREIGN PATENT DOCUMENTS

JP    2009-137037 A    6/2009

*Primary Examiner* — Helen Zong
(74) *Attorney, Agent, or Firm* — Canon U.S.A., Inc. IP Division

(57) ABSTRACT

Separately providing a shift register for performing serial-to-parallel conversion on a BD signal and a shift register for performing parallel-to-serial conversion on a bit pattern to generate a PWM signal increases the scale of a circuit for adjusting a writing start position in the scanning direction of a light beam. Therefore, the shift register for performing serial-to-parallel conversion on a BD signal and the shift register for performing parallel-to-serial conversion on a bit pattern to generate a PWM signal are configured as a common register.

17 Claims, 12 Drawing Sheets

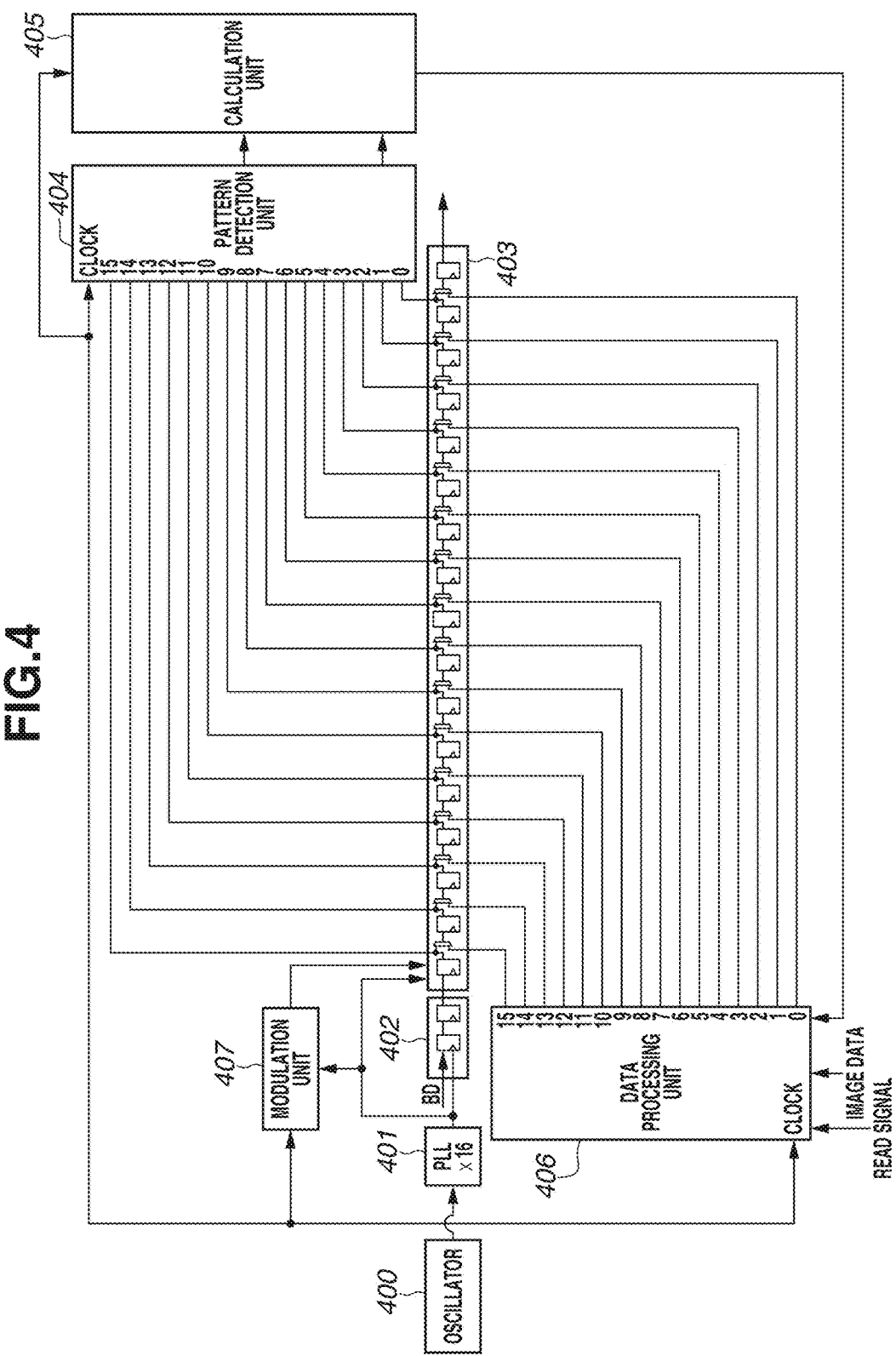

FIG.5

16-BIT BINARY BIT PATTERN

<table>
<tr><th rowspan="2">4-BIT<br>DENSITY<br>DATA</th><th></th><th>0</th><th>1</th><th>2</th><th>3</th><th>4</th><th>5</th><th>6</th><th>7</th><th>8</th><th>9</th><th>10</th><th>11</th><th>12</th><th>13</th><th>14</th><th>15</th></tr>
<tr><td>0000</td><td>0</td><td>0</td><td>0</td><td>0</td><td>0</td><td>0</td><td>0</td><td>0</td><td>0</td><td>0</td><td>0</td><td>0</td><td>0</td><td>0</td><td>0</td><td>0</td></tr>
<tr><td></td><td>0001</td><td>0</td><td>0</td><td>0</td><td>0</td><td>0</td><td>0</td><td>0</td><td>0</td><td>0</td><td>0</td><td>0</td><td>0</td><td>0</td><td>0</td><td>0</td><td>1</td></tr>
<tr><td></td><td>0010</td><td>0</td><td>0</td><td>0</td><td>0</td><td>0</td><td>0</td><td>0</td><td>0</td><td>0</td><td>0</td><td>0</td><td>0</td><td>0</td><td>0</td><td>1</td><td>1</td></tr>
<tr><td></td><td>0011</td><td>0</td><td>0</td><td>0</td><td>0</td><td>0</td><td>0</td><td>0</td><td>0</td><td>0</td><td>0</td><td>0</td><td>0</td><td>0</td><td>1</td><td>1</td><td>1</td></tr>
<tr><td></td><td>0100</td><td>0</td><td>0</td><td>0</td><td>0</td><td>0</td><td>0</td><td>0</td><td>0</td><td>0</td><td>0</td><td>0</td><td>0</td><td>1</td><td>1</td><td>1</td><td>1</td></tr>
<tr><td></td><td>0101</td><td>0</td><td>0</td><td>0</td><td>0</td><td>0</td><td>0</td><td>0</td><td>0</td><td>0</td><td>0</td><td>0</td><td>1</td><td>1</td><td>1</td><td>1</td><td>1</td></tr>
<tr><td></td><td>0110</td><td>0</td><td>0</td><td>0</td><td>0</td><td>0</td><td>0</td><td>0</td><td>0</td><td>0</td><td>0</td><td>1</td><td>1</td><td>1</td><td>1</td><td>1</td><td>1</td></tr>
<tr><td></td><td>0111</td><td>0</td><td>0</td><td>0</td><td>0</td><td>0</td><td>0</td><td>0</td><td>0</td><td>0</td><td>1</td><td>1</td><td>1</td><td>1</td><td>1</td><td>1</td><td>1</td></tr>
<tr><td></td><td>1000</td><td>0</td><td>0</td><td>0</td><td>0</td><td>0</td><td>0</td><td>0</td><td>0</td><td>1</td><td>1</td><td>1</td><td>1</td><td>1</td><td>1</td><td>1</td><td>1</td></tr>
<tr><td></td><td>1001</td><td>0</td><td>0</td><td>0</td><td>0</td><td>0</td><td>0</td><td>0</td><td>1</td><td>1</td><td>1</td><td>1</td><td>1</td><td>1</td><td>1</td><td>1</td><td>1</td></tr>
<tr><td></td><td>1010</td><td>0</td><td>0</td><td>0</td><td>0</td><td>0</td><td>0</td><td>1</td><td>1</td><td>1</td><td>1</td><td>1</td><td>1</td><td>1</td><td>1</td><td>1</td><td>1</td></tr>
<tr><td></td><td>1011</td><td>0</td><td>0</td><td>0</td><td>0</td><td>0</td><td>1</td><td>1</td><td>1</td><td>1</td><td>1</td><td>1</td><td>1</td><td>1</td><td>1</td><td>1</td><td>1</td></tr>
<tr><td></td><td>1100</td><td>0</td><td>0</td><td>0</td><td>0</td><td>1</td><td>1</td><td>1</td><td>1</td><td>1</td><td>1</td><td>1</td><td>1</td><td>1</td><td>1</td><td>1</td><td>1</td></tr>
<tr><td></td><td>1101</td><td>0</td><td>0</td><td>0</td><td>1</td><td>1</td><td>1</td><td>1</td><td>1</td><td>1</td><td>1</td><td>1</td><td>1</td><td>1</td><td>1</td><td>1</td><td>1</td></tr>
<tr><td></td><td>1110</td><td>0</td><td>0</td><td>1</td><td>1</td><td>1</td><td>1</td><td>1</td><td>1</td><td>1</td><td>1</td><td>1</td><td>1</td><td>1</td><td>1</td><td>1</td><td>1</td></tr>
<tr><td></td><td>1111</td><td>0</td><td>1</td><td>1</td><td>1</td><td>1</td><td>1</td><td>1</td><td>1</td><td>1</td><td>1</td><td>1</td><td>1</td><td>1</td><td>1</td><td>1</td><td>1</td></tr>
</table>

DATA PROCESSING APPARATUS AND IMAGE FORMING APPARATUS HAVING SHIFT REGISTER FOR PARALLEL AND SERIAL SIGNAL CONVERSIONS

BACKGROUND OF THE INVENTION

Field of the Invention

One disclosed aspect of the embodiments relates to a data processing apparatus for controlling an image writing start position in the scanning direction of a light beam by using a shift register, and to an image forming apparatus.

Description of the Related Art

An electrophotographic image forming apparatus includes a light scanning apparatus having a deflection device such as a rotating polygon mirror for deflecting a light beam. When the deflection device scans the surface of a photosensitive member a plurality of times by using a deflected light beam, an electrostatic latent image is formed on the photosensitive member. The image forming apparatus develops the electrostatic latent image on the photosensitive member by using toner, and then transfers the developed toner image onto a recording medium to form an image on the recording medium.

The light scanning apparatus includes a light receiving element disposed on a scanning path of the light beam deflected by the deflection device. The light receiving element includes a light receiving surface. When a light beam scans the light receiving surface of the light receiving element, the light receiving element generates a light reception signal. To control the image writing start position in the scanning direction of the light beam, the image forming apparatus controls the emission timing of the light beam based on image data with reference to the generation timing of the light reception signal.

Japanese Patent Application Laid-Open No. 2009-137037 discusses an image forming apparatus including a shift register for performing serial-to-parallel conversion on a beam detector (BD) signal and a shift register for performing parallel-to-serial conversion on a bit pattern to generate a pulse width modulation (PWM) signal.

However, as described above, the image forming apparatus discussed in Japanese Patent Application Laid-Open No. 2009-137037 includes a plurality of shift registers for performing serial-to-parallel conversion on a BD signal and parallel-to-serial conversion on a bit pattern, resulting in a large circuit scale of a circuit for controlling a light scanning apparatus.

These techniques create problems for image processing and/or forming devices or apparatuses.

SUMMARY OF THE INVENTION

According to an aspect of the embodiments, a data processing apparatus is included in an image forming apparatus and operates in response to a clock signal. The image forming apparatus includes a photosensitive member, a light source configured to emit a light beam, a deflection unit configured to deflect the light beam so that the light beam scans a surface of the photosensitive member, a photoelectric conversion element configured to receive the light beam deflected by the deflection unit and configured to output a photoelectric conversion signal in response to a reception of the light beam, and a drive unit configured to drive the light source based on a drive signal generated based on image data. The data processing apparatus includes a shift register configured to shift and serially output latched bit data in a cycle of the clock signal, a first input unit configured to serially input bit data, obtained by sampling output of the photoelectric conversion signal in the cycle of the clock signal, to the shift register in the cycle of the clock signal, an acquisition unit configured to parallelly acquire a first bit pattern, latched by the shift register as a result of shifting the bit data input from the first input unit by the shift register, in a cycle N times the cycle of the clock signal (N is a positive integer larger than 1), a processing unit configured to perform correction processing on image data for adjusting an image writing start position in a scanning direction of the light beam based on the first bit pattern acquired by the acquisition unit, and a second input unit configured to parallelly input a second bit pattern, as the image data processed by the processing unit in synchronization with an acquisition of the first bit pattern by the acquisition unit, to the shift register in a cycle N times the cycle of the clock signal. The shift register serially outputs the bit data included in the input second bit pattern from a flip-flop on a most downstream side in synchronization with the clock signal to generate the drive signal.

According to another aspect of the embodiments, a data processing apparatus is included in an image forming apparatus and operates in response to a first clock signal having a first frequency and a second clock signal having a frequency which is an integral multiple of the first frequency and synchronizing with the first clock signal. The image forming apparatus includes a photosensitive member, a light source configured to emit a light beam, a deflection unit configured to deflect the light beam so that the light beam scans a surface of the photosensitive member, a photoelectric conversion element configured to receive the light beam deflected by the deflection unit and configured to output a photoelectric conversion signal in response to a reception of the light beam, and a drive unit configured to drive the light source based on a drive signal generated based on image data. The data processing apparatus includes a shift register configured to shift and output latched bit data in response to the second clock signal, a first input unit configured to serially input bit data, obtained by sampling output of the photoelectric conversion signal in response to the second clock signal, to the shift register in response to the second clock signal, an acquisition unit configured to parallelly acquire a first bit pattern, latched by the shift register as a result of shifting the bit data input from the first input unit by the shift register, in synchronization with the first clock signal, a processing unit configured to perform correction processing on image data for adjusting an image writing start position in a scanning direction of the light beam based on the first bit pattern acquired by the acquisition unit, and a second input unit configured to parallelly input a second bit pattern, as the image data processed by the processing unit in synchronization with the first clock signal, to the shift register in order for synchronization with an acquisition of the first bit pattern by the acquisition unit. The shift register serially outputs the bit data included in the input second bit pattern from a flip-flop on a most downstream side in synchronization with the second clock signal to generate the drive signal.

According to yet another aspect of the embodiments, an image forming apparatus includes a photosensitive member, a light source configured to emit a light beam, a deflection unit configured to deflect the light beam so that the light beam scans a surface of the photosensitive member, a photoelectric conversion element configured to receive the light beam deflected by the deflection unit and output a photoelectric conversion signal in response to a reception of the light beam, a drive unit configured to drive the light source based on a drive signal generated based on image data, and a data processing apparatus configured to operate in response to a clock signal. The data processing apparatus includes a shift register configured to shift and serially output latched bit data in a cycle of the clock signal, a first input unit configured to serially input bit data, obtained by sampling output of the photoelectric conversion signal in the cycle of the clock signal, to the shift register in the cycle of the clock signal, an acquisition unit configured to parallelly acquire a first bit pattern, latched by the shift register as a result of shifting the bit data input from the first input unit by the shift register, in a cycle N times the cycle of the clock signal (N is a positive integer larger than 1), a processing unit configured to perform processing on image data for adjusting an image writing start position in a scanning direction of the light beam based on the first bit pattern acquired by the acquisition unit, and a second input unit configured to parallelly input a second bit pattern, as the image data processed by the processing unit in synchronization with an acquisition of the first bit pattern by the acquisition unit, to the shift register in a cycle N times the cycle of the clock signal. The shift register serially outputs the bit data included in the input second bit pattern from a flip-flop on a most downstream side in synchronization with the clock signal to generate the driver signal.

According to yet another aspect of the embodiments, an image forming apparatus includes a photosensitive member, a light source configured to emit a light beam, a deflection unit configured to deflect the light beam so that the light beam scans a surface of the photosensitive member, a photoelectric conversion element configured to receive the light beam deflected by the deflection unit and output a photoelectric conversion signal in response to a reception of the light beam, a drive unit configured to drive the light source based on a drive signal generated based on image data, a clock signal generation unit configured to generate a first clock signal having a first frequency and a second clock signal having a frequency which is an integral multiple of the first frequency and synchronizing with the first clock signal, a shift register configured to shift and output latched bit data in response to the second clock signal, a first input unit configured to serially input bit data, obtained by sampling output of the photoelectric conversion signal in response to the second clock signal, to the shift register in response to the second clock signal, an acquisition unit configured to parallelly acquire a first bit pattern, latched by the shift register as a result of shifting the bit data input from the first input unit by the shift register, in synchronization with the first clock signal, a processing unit configured to perform correction processing on image data for adjusting an image writing start position in a scanning direction of the light beam based on the first bit pattern acquired by the acquisition unit, and a second input unit configured to parallelly input a second bit pattern, as the image data processed by the processing unit in synchronization with the first clock signal, to the shift register in order for synchronization with an acquisition of the first bit pattern by the acquisition unit. The shift register serially outputs the bit data included in the input second bit pattern from a flip-flop on a most downstream side in synchronization with the first clock signal to generate the drive signal.

Further features of the disclosure will become apparent from the following description of exemplary embodiments with reference to the attached drawings.

BRIEF DESCRIPTION OF THE DRAWINGS

FIG. 4 is a block diagram illustrating a controller included in the image forming apparatus according to the exemplary embodiment.

FIG. 5 illustrates a data conversion table.

FIG. 10 is a table illustrating data shift operations of the shift register.

FIG. 12 is a table illustrating data shift operations of the shift register.

DESCRIPTION OF THE EMBODIMENTS (Image Forming Apparatus)

Figure 1:
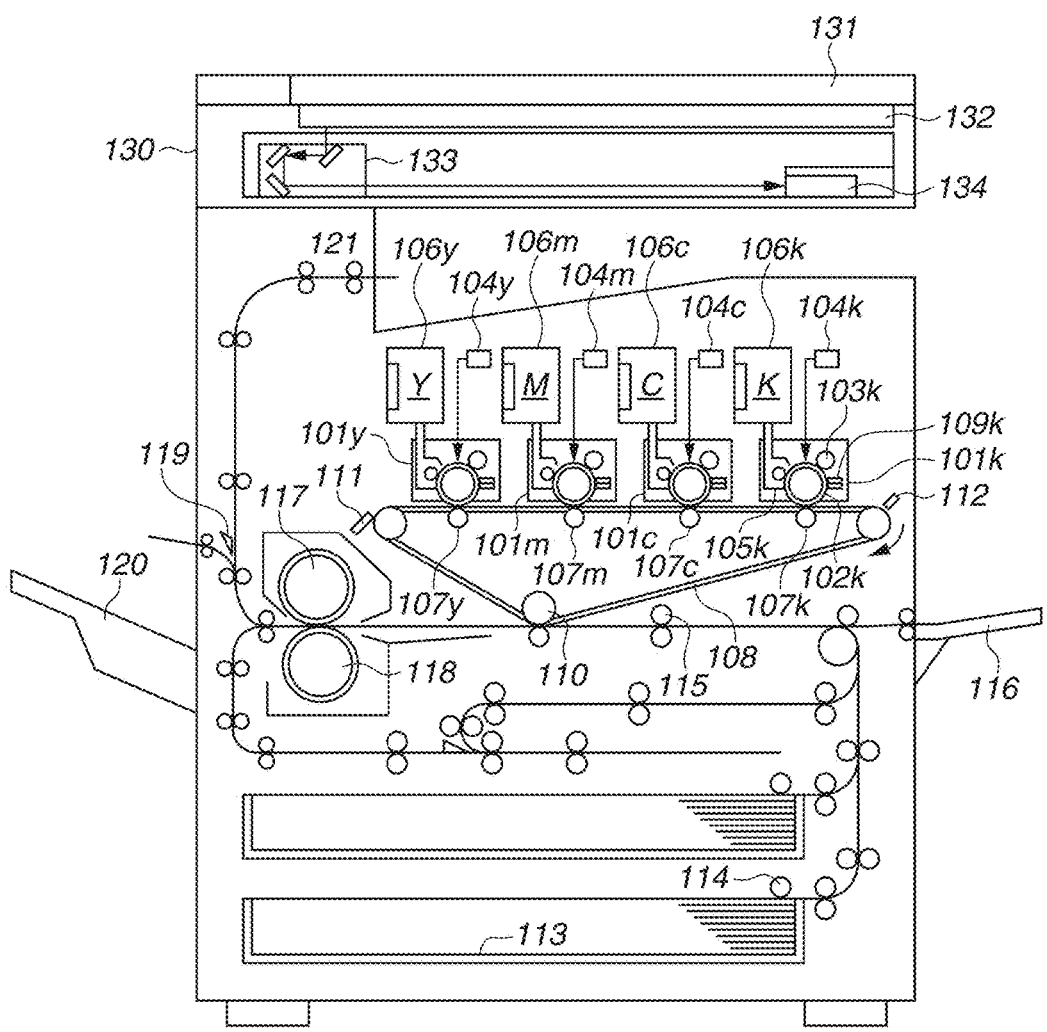
FIG. 1 is a cross-sectional view schematically illustrating an image forming apparatus and a reading apparatus according to an exemplary embodiment.

A first exemplary embodiment will be described below. FIG. 1 is a cross-sectional view illustrating an image forming apparatus 100 and a reader 130.

The reader 130 will be described below. The reader 130 includes a document pressing plate 131, an original mounting glass plate 132, a carriage 133, and a charge coupled device (CCD) line sensor 134. The reader 130 irradiates a document placed between the document pressing plate 131 and the original mounting glass plate 132 with a light source (not illustrated). The carriage 133 includes a plurality of reflection mirrors. The plurality of reflection mirrors guides light reflected from the document to the CCD line sensor 134. The CCD line sensor 134 outputs, in units of lines, a read signal as a result of receiving the light reflected from the document in synchronization with a clock signal.

Each of a yellow process unit 101$y$, a magenta process unit 101$m$, a cyan process unit 101$c$, and a black process unit 101$k$ (a plurality of image forming units) includes a photosensitive drum (photosensitive member), a developing unit, and a charging roller. A photosensitive drum 102$k$ included in the process unit 101$k$ is rotatably driven by a motor. A charging roller 103$k$ applies a high voltage to the photosensitive drum 102$k$ to uniformly charge the surface of the photosensitive drum 102$k$. A laser scanner unit 104$k$ (light scanning apparatus) emits laser light corresponding to image data. The laser light emitted from the laser scanner unit 104$k$ is reflected by a rotatably driven polygon mirror, and scans the photosensitive drum 102$k$ charged by the charging roller 103$k$. When the laser light scans the photosensitive drum 102$k$, an electrostatic latent image is formed on the photosensitive drum 102$k$.

A developing unit 105k develops the electrostatic latent image formed on the photosensitive drum 102k by using toner. A toner bottle 106k filled up with toner supplies the toner to the developing unit 105k. A primary transfer roller 107k primarily transfers a toner image formed on the photosensitive drum 102k onto an intermediate transfer member (image bearing member) 108 which is an endless belt-like member. As a result, yellow, magenta, cyan, and black toner images are superposed on the intermediate transfer member 108. An auxiliary charging brush 109k charges toner remaining on the photosensitive drum 102k without being transferred onto the intermediate transfer member 108.

A toner image forming process of the black process unit 101k (including the photosensitive drum 102k, the charging roller 103k, the developing unit 105k, and the auxiliary charging brush 109k) has been described above as an example. The yellow process unit 101y, the magenta process unit 101m, and the cyan process unit 101c form toner images in a similar way. Hereinafter, a photosensitive drum 102, a charging roller 103, a developing unit 105, and an auxiliary charging brush 109 collectively indicate individual components for four colors, yellow, magenta, cyan, and black. A toner image primarily transferred onto the intermediate transfer member 108 is secondarily transferred onto paper by a secondary transfer roller 110. Toner remaining on the intermediate transfer member 108 without being transferred onto paper and a toner image for adjustment that is not intended to be transferred onto paper are collected by a cleaner 111. A pattern detection sensor 112 detects a toner pattern image formed on the intermediate transfer member 108.

Sheets are stored in a paper cassette 113 and conveyed by a feed roller 114. Then, after skew is corrected by a registration roller 115, each sheet is sent to the secondary transfer roller 110. After a toner image is transferred onto the sheet by the secondary transfer roller 110, toner is thermally fixed to the sheet by a fixing roller 117 and a pressure roller 118. Then, the sheet is sent to a discharge tray 120 or an inner discharge tray 121 by a sheet discharge flapper 119.

(Light Scanning Apparatus)

Figure 2:
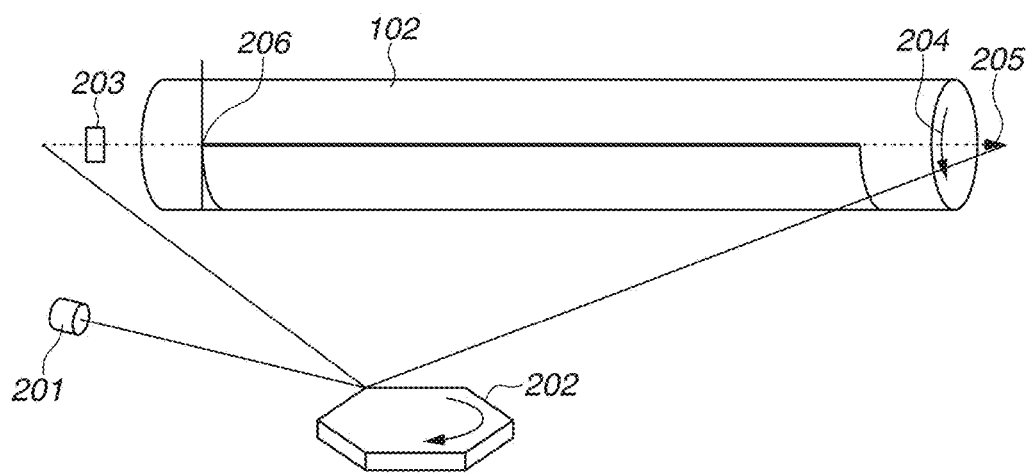
FIG. 2 is a schematic view illustrating a light scanning apparatus included in the image forming apparatus according to the exemplary embodiment.

An overall configuration of the laser scanner unit 104 will be described below. FIG. 1 illustrates an overall configuration of the laser scanner unit 104. FIG. 2 illustrates a photosensitive drum 102. The laser scanner unit 104 includes a laser light source 201, a rotating polygon mirror (polygon mirror) 202 and a beam detector (BD) 203. The laser light source 201 emits laser light (a light beam) for forming an electrostatic latent image on the photosensitive drum 102. As illustrated in FIG. 2, the photosensitive drum 102 is rotating in a sub scanning direction 204 centering on the rotation axis. The polygon mirror 202 deflects the laser light to allow it to scan the surface of the photosensitive drum 102 in the direction along the rotation axis (in a main scanning direction 205).

The BD 203 is a photoelectric conversion element disposed in the non-image forming area on the scanning path of the laser light deflected by the polygon mirror 202. When the laser light scans the BD 203, the BD 203 outputs a BD signal as a photoelectric conversion signal.

The image forming apparatus 100 adjusts the image writing timing in the main scanning direction for each laser light scanning cycle with reference to the BD signal output timing to achieve an identical image writing start position 206 in each scanning cycle.

(Control Block Diagram of Image Forming Apparatus)

Figure 3:
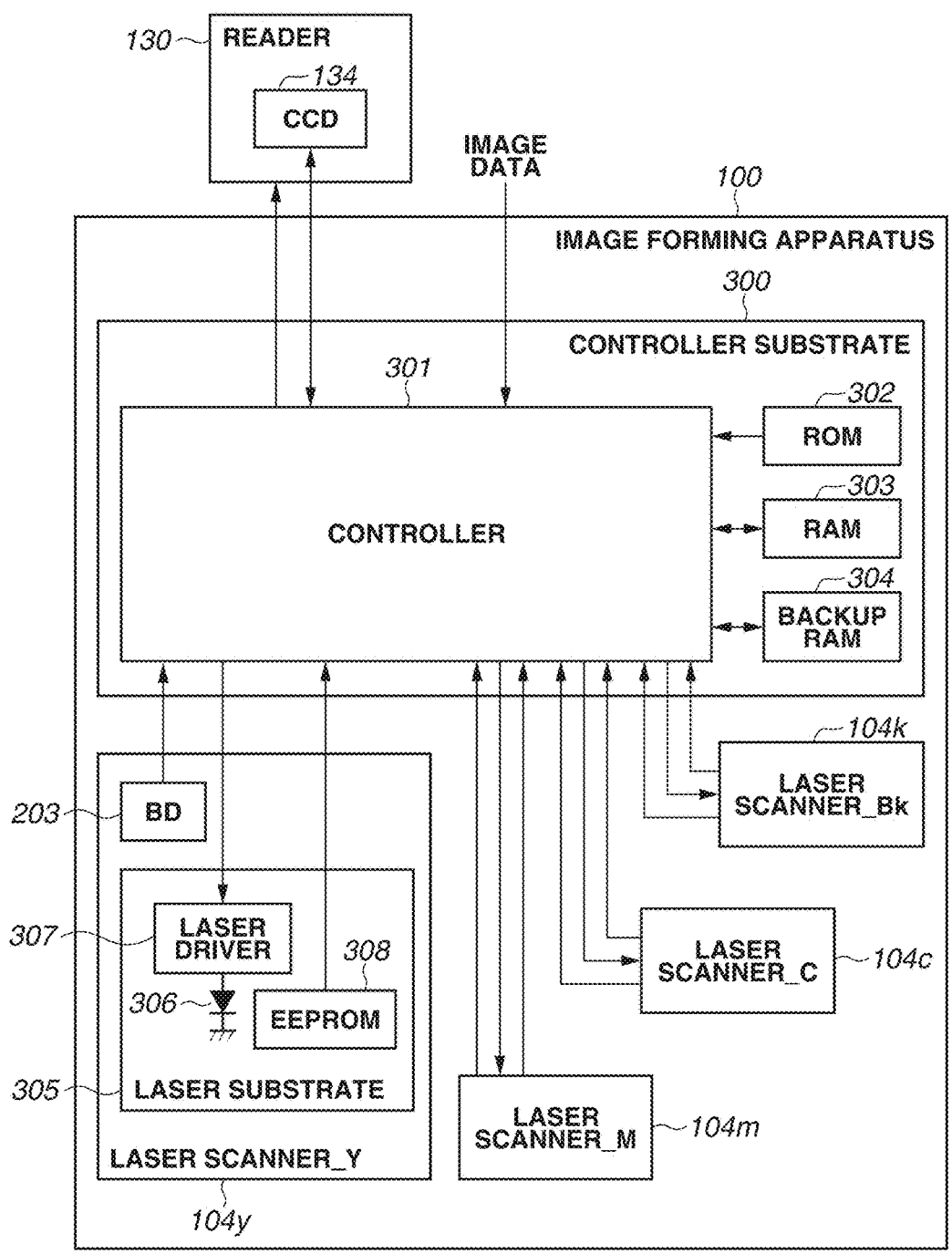
FIG. 3 is a control block diagram illustrating the image forming apparatus according to the exemplary embodiment.

FIG. 3 is a block diagram illustrating the image forming apparatus 100 and the reader 130. The image forming apparatus 100 includes a controller substrate 300. The controller substrate 300 includes a controller (control unit) 301, a read only memory (ROM) 302, a random access memory (RAM) 303, and a backup RAM 304. The controller 301 controls the reader 130 and the image forming apparatus 100. The controllers 301 is an integrated circuit (IC) chip such as a central processing unit (CPU) and a microcontroller. The ROM 302 stores programs necessary for the control unit 301 to operate. The RAM 303 is used to temporarily store data necessary for the controller 301 to control the image forming apparatus 100. The backup RAM 304 is a storage unit for making it possible to store control data set to the image forming apparatus 100 even after power of the image forming apparatus 100 is turned OFF. Power is supplied to the backup RAM 304 by a backup battery (not illustrated).

The controller 301 inputs image data from an external informing apparatus such as a personal computer (PC) and a portable information terminal. A read signal is also input to the controller 301 from the CCD line sensor 134 of the reader 130. The controller 301 generates a drive signal (PWM signal) for driving a laser scanner by processing the image data and the read signal.

The laser scanner 104y will be described below. In the image forming apparatus 100 according to the present exemplary embodiment, a laser scanner 104m, a laser scanner 104c, and a laser scanner 104k have a similar configuration to that of the laser scanner 104y, redundant descriptions thereof will be omitted.

The laser scanner 104y includes a laser substrate 305. A laser light source 306, a laser driver 307, and an electrically erasable programmable read only memory (EEPROM) 308 are mounted on the laser substrate 305. The laser driver 307 supplies a drive current to the laser light source 306 based on the PWM signal input from the controller 301. The PWM signal contains pulses. For example, when the input PWM signal is set to the High level (when a pulse is input), the laser driver 307 supplies the drive current to the laser light source 306. On the other hand, when the input PWM signal is set to the Low level (when a pulse is not input), the laser driver 307 does not supply the drive current to the laser light source 306.

The EEPROM 308 stores correction values specific to the laser scanner 104y. For example, when the laser light source 306 includes a plurality of light emitting points including a first light emitting point and a second light emitting point, the EEPROM 308 stores data related to a light emission delay amount of the second light emitting point with respect to the first light emitting point in one scanning cycle. When power of the image forming apparatus is turned ON, the controller 301 reads the data related to the light emission delay amount from the EEPROM 308 and stores the data in the RAM 302. Then, based on the data related to the light emission delay amount stored in the RAM 302, the controller 301 controls the relative light emission timing of the first and the second light emitting points. When this control is performed, the writing start position of a line image formed by each light emitting point in the main scanning direction is almost identical.

(Internal Modules of Controller)

Internal modules of the controller 301 will be described below with reference to FIGS. 4 to 7. The controller 301 includes an oscillator 400, a phase locked loop (PLL) 401, a buffer unit (first input unit) 402, a shift register 403, a pattern detection unit (acquisition unit) 404, a calculation unit 405, a data processing unit (second input unit) 406, and a modulation unit 407. The oscillator 400 outputs a clock signal CLK_A having a constant frequency. The clock signal CLK_A is input to the PLL 401, the pattern detection unit 404, the calculation unit 405, the data processing unit 406, the data input unit 407, and the modulation unit 407. The PLL 401, the pattern detection unit 404, the calculation unit 405, the data processing unit 406, and the data input unit 407 operate in synchronization with the clock signal CLK_A.

The oscillator 400 and PLL 401 function as a clock signal generation unit. The PLL 401 frequency-multiplies the input clock signal CLK_A by an integer number N (N is a positive integer larger than 1) to generate a clock signal CLK_B having a higher frequency than that of the clock signal CLK_A. For example, the oscillator 400 outputs a 100 MHz clock signal CLK_A, and the PLL 401 frequency-multiplies the clock signal CLK_A by 16 to generate a 1.6 GHz clock signal CLK_B. The PLL 401 outputs the generated clock signal CLK_B. The clock signal CLK_B is input to the buffer unit 402, the shift register 403, and the modulation unit 407. The modulation unit 407 generates a selection (Select) signal (described below) based on the clock signals CLK_A and CLK_B. The Select signal is input to the shift register 403.

All of the oscillator 400, the PLL 401, and the modulation unit 407 may be provided outside the controller 301, and at least one of the oscillator 400, the PLL 401, and the modulation unit 407 may be provided outside the controller 301. It is also possible that the oscillator 400 generates the clock signal CLK_B, and the PLL 401 frequency-divides the clock signal CLK_B to generate the clock signal CLK_A.

The data processing unit 406 performs, for example, the following data processing. The data processing unit 406 inputs a red, green, and blue (RGB) read signal from the reader 130 and RGB image data from an external informing apparatus. The data processing unit 406 converts the input RGB data into yellow (Y), magenta (M), cyan (C), and black (Bk) data (color conversion processing). The data generated in the color conversion processing by the image forming apparatus according to the present exemplary embodiment is density data having a tone expression using the number of bits out of 8 bits. The data processing unit 406 performs tone correction processing on the density data by using a γ look-up table. The tone-corrected density data is also 8-bit data.

The data processing unit 406 performs screen processing or error diffusion processing on the tone-corrected 8-bit density data by using 4×4 dither matrix patterns to convert the density data into 4-bit data. This 4-bit data is density data having 0 to 15 tones which indicate the density. The data processing unit 406 converts the 4-bit density data into a 16-bit binary bit pattern by using a conversion table stored in the ROM 302.

FIG. 5 illustrates an example of the conversion table used by the data processing unit 406. The leftmost column indicates 4-bit density data, and each row indicates a 16-bit binary bit pattern. For example, when the data processing unit 406 derives density data "0110" after the tone correction processing on a first area in the main scanning direction, the data processing unit 406 converts the density data "0110" into a binary bit pattern "0000000000111111" by using the conversion table. Further, when the data processing unit 406 derives density data "1100" after the tone correction processing on a second area adjacent to the first area in the main scanning direction, the data processing unit 406 converts the density data "1100" into a binary bit pattern "0000111111111111" by using the conversion table.

The data output unit 406 parallelly outputs a binary bit pattern "0000000000111111" corresponding to the first area to the shift register 403 (described below) in synchronization with the pulse of the clock signal CLK_A.

The data output unit 406 also outputs a binary bit pattern "0000111111111111" corresponding to the second area to the shift register 403 in synchronization with the next pulse of the clock signal CLK_A.

Although the conversion table for converting the 4-bit density data into a 16-bit binary bit pattern is illustrated in FIG. 5, the conversion method according to the exemplary embodiment is not limited thereto. The 4-bit density data may be converted into a bit pattern of an arbitrary number of bits (for example, a 32-bit binary bit pattern). For example, when the data processing unit 406 uses a conversion table for converting density data into a 32-bit binary bit pattern, the shift register 403 needs to be at least a 33-bit shift register. In this case, to parallelly output a binary bit pattern from the data input unit 407 to the shift register 403 in synchronization with the clock signal CLK_A, 32 output units need to be provided in the data input unit 407. Further, the PLL 401 needs to generate a clock signal by frequency-multiplying the clock signal oscillated by the oscillator 400 by 32. More specifically, the frequency-multiplication number of the clock signal coincides with the number of bits in binary bit patterns input to and output from the shift register 403.

(Buffer Unit)

Figure 6:
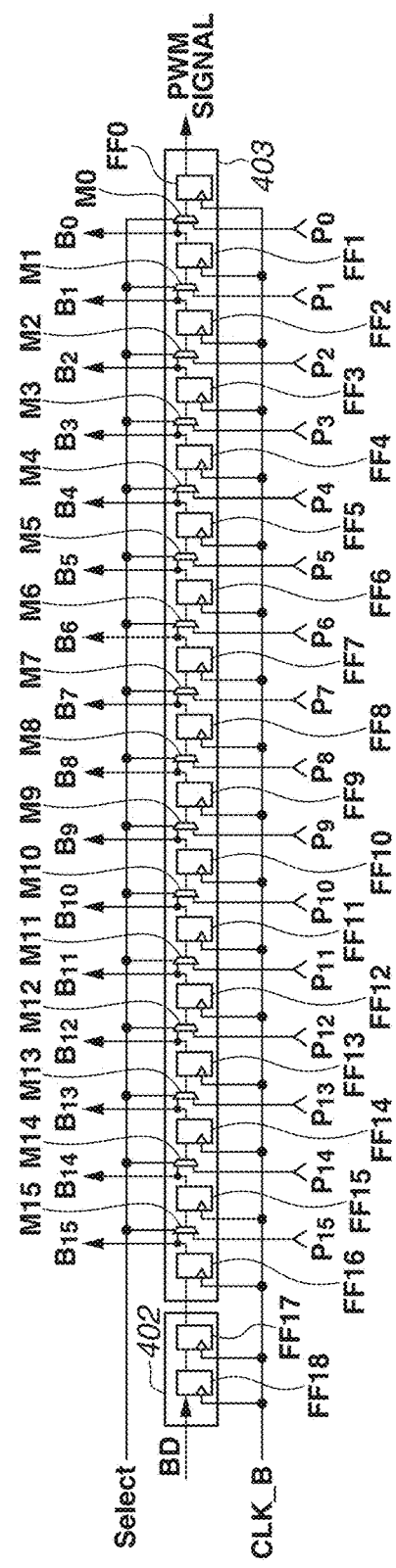
FIG. 6 illustrates a shift register included in the controller according to the exemplary embodiment.

FIG. 6 is an enlarged view illustrating the buffer unit 402 and the shift register 403 illustrated in FIG. 4. The buffer unit 402 includes two D flip-flops (FFs) 17 and 18 connected with each other. The clock signal CLK_B is input to the FF 17 and FF 18. The BD signal is input to the input terminal of the FF 18. The FF 18 latches (memorizes) bit data ("0" or "1") corresponding to the level of the input BD signal in response to the clock signal CLK_B (in each cycle of the clock signal CLK_B). For example, when the BD signal of the High level is input to the FF 18, the FF 18 latches BD bit data "1" in response to a pulse input of the clock signal CLK_B. On the other hand, when the BD signal of the Low level is input to the FF 18, the FF 18 latches BD bit data "0" in response to a pulse input of the clock signal CLK_B.

Then, in synchronization with a pulse (for example, the X-th pulse) of the clock signal CLK_B, the FF 18 outputs the latched bit data to the FF 17 and latches the bit data ("0" or "1") corresponding to the input BD signal. In synchronization with the X-th pulse of the clock signal CLK_B, the FF 17 outputs the BD bit data, input from the FF 18 in synchronization with the preceding (X-1)-th pulse of the clock signal CLK_B, to the FF 16 on the most upstream side of the shift register 403 and latches the next BD bit data input from the FF 18.

In this way, the buffer unit 402 serially inputs the BD bit data to the shift register 403 by sequentially shifting the bit data corresponding to the BD signal in synchronization with the CLK signal CLK_B.

(Shift Register)

The shift register 403 will be described below. As illustrated in FIG. 6, the shift register 403 according to the present exemplary embodiment is a 17-bit shift register composed of 17 D flip-flops (FF 0 to FF 16) in serial multi-stage connection (cascade connection). The shift register 403 is a circuit for shifting the bit data (BD bit data and PWM bit data) latched by each FF. The FF 0, FF 1, FF 2, ..., FF 16 are disposed in this order from the downstream side in the bit data shift direction. The clock signal CLK_B is input to the FF 0 to FF 16. Each of the FF 0 to FF 16 shifts the latched bit data toward the side of the FF 0 in synchronization with the clock signal CLK_B. The FF 0 positioned on the most downstream side in the bit data shift direction outputs the bit data as a PWM signal in synchronization with the CLK signal CLK_B. The PWM signal output from the FF 0 is input to the laser driver 307. The image forming apparatus according to the present exemplary embodiment needs at least N+1 flip-flops for the N-bit BD bit pattern and the N-bit PWM bit pattern.

Sixteen multiplexers M 0 to M 15 are provided between adjacent FFs, i.e., the M 0, M 1, M 2, . . . , M 15 are disposed in this order from the downstream side in the bit data shift direction. More specifically, as illustrated in FIG. 6, the multiplexer M 0 is provided between the FF 0 and the FF 1, and the multiplexer M 1 is disposed between the FF 1 and the FF 2.

The output terminals of the FF 1 to FF 16 are connected to the terminals 404_0 to 404_15 of the pattern detection unit 404 and the first input terminals of the multiplexers M 0 to M 15 on the downstream side, respectively. The terminals 406_0 to 406_15 of the data processing unit 406 are connected to the second input terminals of the multiplexers M 0 to M 15, respectively. The output terminals of the multiplexers M 0 to M 15 are connected to the input terminals of the FF 0 to the FF 15 on the downstream side, respectively.

The Select signal is input to the multiplexers M 0 to M 15. When the Select signal of the High level is input, the multiplexers M 0 to M 15 connect the terminals 406_0 to 406_15 of the data processing unit 406 and the input terminals of the FF 0 to FF 15, respectively. On the other hand, when the Select signal of the Low level is input, the multiplexers M 0 to M 15 connect the output and input terminals of adjacent FFs.

When the multiplexers M 0 to M 15 connect the terminals 406_0 to 406_15 of the data processing unit 406 and the input terminals of the FF 0 to FF 15, respectively, the PWM bit data P0 to P15 are input from the terminals 406_0 to 406_15 of the data processing unit 406 to the FF 0 to FF 15 of the shift register 403, respectively. On the other hand, when the Select signal of the Low level is input, the shift register 403 shifts in synchronization with the clock signal CLK_B the BD bit data or PWM bit data latched by the FF 0 to FF 16. In one cycle of the clock signal CLK_B, the bit data only shifts to each FF located on the downstream side in the bit data shift direction.

(Descriptions of Shift Register Operations Using Simplified Model)

Figure 7:
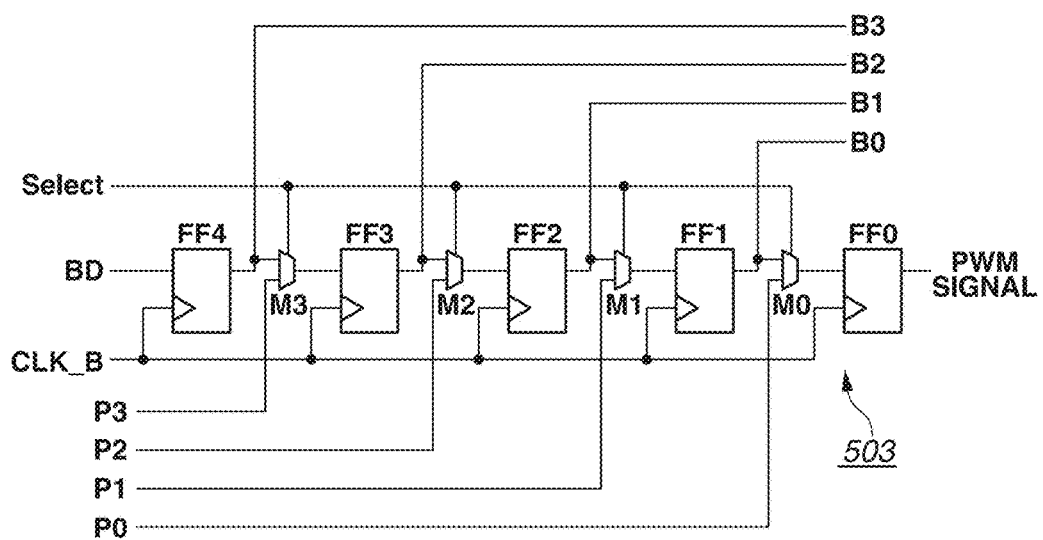
FIG. 7 is a schematic view illustrating a simplified model of the shift register.
Figure 8:
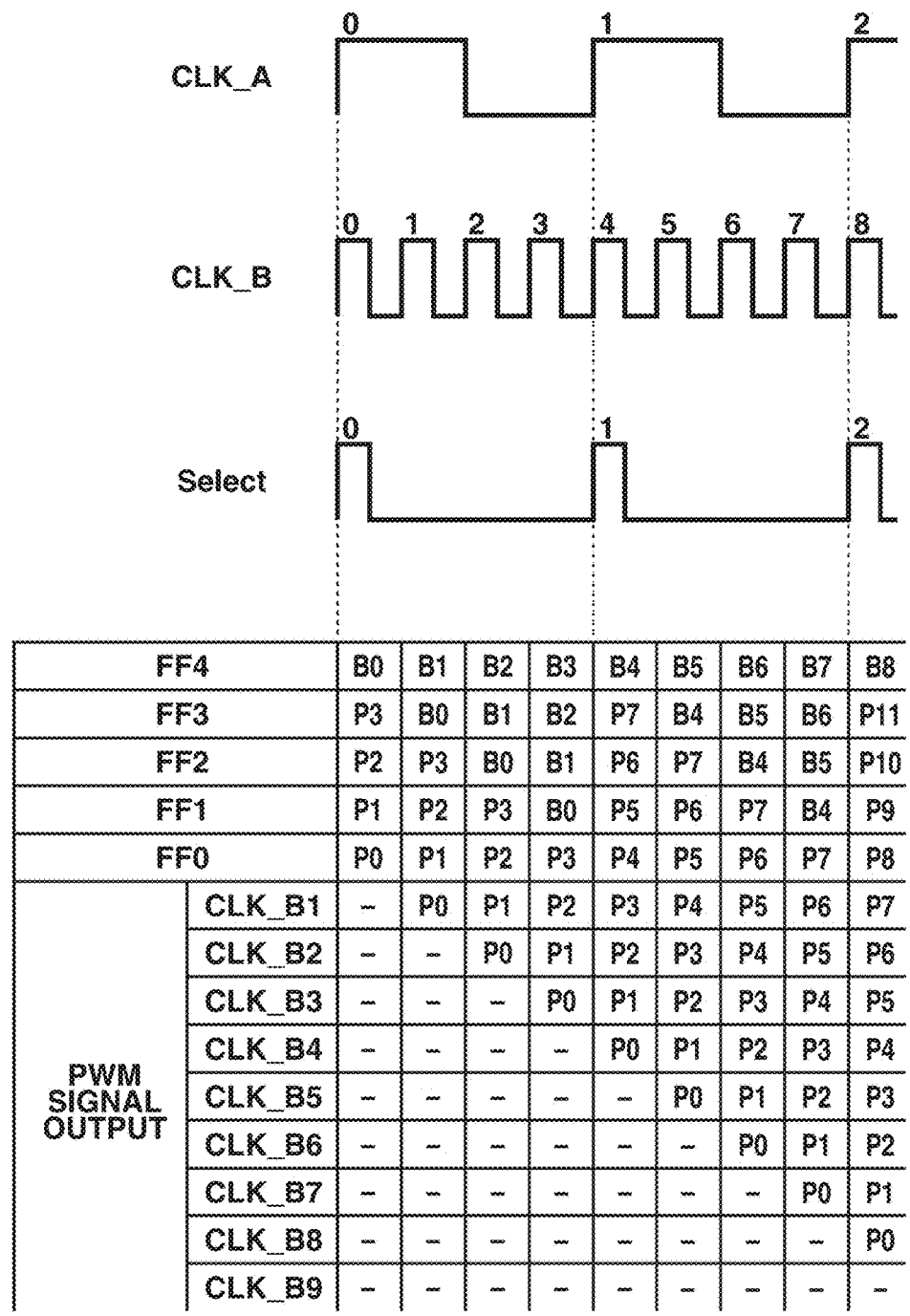
FIG. 8 is a timing chart illustrating operations of the simplified model of the shift register.

Operations of the shift register 403 will be described below with reference to FIGS. 7 and 8. FIG. 7 illustrates a simplified model of the shift register 403 illustrated in FIG. 6, i.e., a 5-bit shift register 503. FIG. 8 is a timing chart illustrating shift operations of the shift register 503 illustrated in FIG. 7.

FIG. 8 illustrates a clock signal CLK_A, a clock signal CLK_B, a Select signal, shift operations of the shift register 503, and a PWM signal output (PWM output). Referring to FIG. 8, the clock signal CLK_B is generated by frequency-multiplying the clock signal CLK_A by 4. More specifically, the cycle of the clock signal CLK_A is 4 times the cycle of the clock signal CLK_B. The clock signals CLK_A and CLK_B have a synchronous relation. Numerical values supplied to the pulses of the clock signal CLK_A, the clock signal CLK_B, and the Select signal are signal count values supplied for the sake of convenience. Each timing will be described below with reference to the count value of the clock signal CLK_B. For example, the cycle of the third pulse of the clock signal CLK_B is referred to as CLK_B3.

The Select signal will be described below with reference to FIG. 8. The clock signals CLK_A and CLK_B are input to the modulation unit 407 illustrated in FIG. 4. The modulation unit 407 activates the Select signal in synchronization with the rising edge of the clock signal CLK_A, and deactivates the Select signal in synchronization with the falling edge of the clock signal CLK_B immediately after activating the Select signal. The modulation unit 407 generates the Select signal by performing this processing.

Referring to the table in FIG. 8, "Pn" indicates the PWM bit data for generating the PWM signal, and "Bn" indicates the BD bit data as a result of sampling the BD signal.

As illustrated in FIG. 8, the Select signal at CLK_B0 is set to the High level. Therefore, the bit data P0 to P3 are input to the FF 0 to FF 3 via the multiplexers M 0 to M 3, respectively. At CLK_B0, B0 is input to the FF 4.

The Select signal at CLK_B1 to CLK_B3 is set to the Low level. Therefore, at CLK_B1 to CLK_B3, the shift register 503 performs shift operations on the bit data stored in the FF 0 to FF 4.

At CLK_B1, when a shift operation is performed, the FF 0 outputs P0, the bit data stored in the FF 4 to FF 1 is shifted to the FF3 to FF 0, respectively, and B1 is input to the FF 4. More specifically, at CLK_B1, the bit data stored in the FF 0 to FF 4 of the shift register 503 becomes (FF 0, FF 1, FF 2, FF 3, FF 4)=(P1, P2, P3, B0, B1). In this way, the shift register 503 stores BD bit patterns and PWM bit patterns.

At CLK_B2, when a shift operation is performed, the FF 0 outputs P1, the bit data stored in the FF 4 to FF 1 is shifted to the FF3 to FF 0, respectively, and B2 is input to the FF 4. More specifically, at CLK_B2, the bit data stored in the FF 0 to FF 4 of the shift register 503 becomes (FF 0, FF 1, FF 2, FF 3, FF 4)=(P2, P3, B0, B1, B2).

At CLK_B3, when a shift operation is performed, the FF 0 outputs P2, the bit data stored in the FF 4 to FF 1 is shifted to the FF3 to FF 0, respectively, and B3 is input to the FF 4. More specifically, at CLK_B3, the bit data stored in the FF 0 to FF 4 of the shift register 503 becomes (FF 0, FF 1, FF 2, FF 3, FF 4)=(P3, B0, B1, B2, B3).

At CLK_B4, when a shift operation is performed, the FF 0 outputs P3. At CLK_B4, the pattern detection unit 404 acquires (FF 1, FF 2, FF 3, FF 4)=(B0, B1, B2, B3) stored in the FF 1 to FF 4 in synchronization with CLK_A1. At this timing, the Select signal is set to High, and therefore P4 to P7 are input from the data input unit 407 to the FF 0 to FF 3 via the multiplexers M 3 to M 0, respectively. Further, data B4 is input to the FF 4 in synchronization with CLK_B4. More specifically, in synchronization with CLK_B4, P3 is output as a PWM signal, P4 to P7 are input to the FF 0 to FF 3, respectively, and the data stored in the shift register 503 becomes (FF 0, FF 1, FF 2, FF 3, FF 4)=(B4, P7, P6, P5, P4). Then, the pattern detection unit 404 acquires the BD bit pattern (B0, B1, B2, B3) in synchronization with CLK_A1 (at the same timing as CLK_B4).

At CLK_B5 and subsequent clocks, the shift register 503 performs the above-described shift operation in synchronization with the clock signal CLK_B. At CLK_B5 and subsequent timing, as described above, the data processing unit 406 inputs a PWM bit pattern to the shift register 503 in synchronization with the clock signal CLK_A. As described above, the pattern detection unit 404 acquires the BD bit pattern from the shift register 503 in synchronization with the clock signal CLK_A.

(Pattern Detection Unit)

Figure 9:
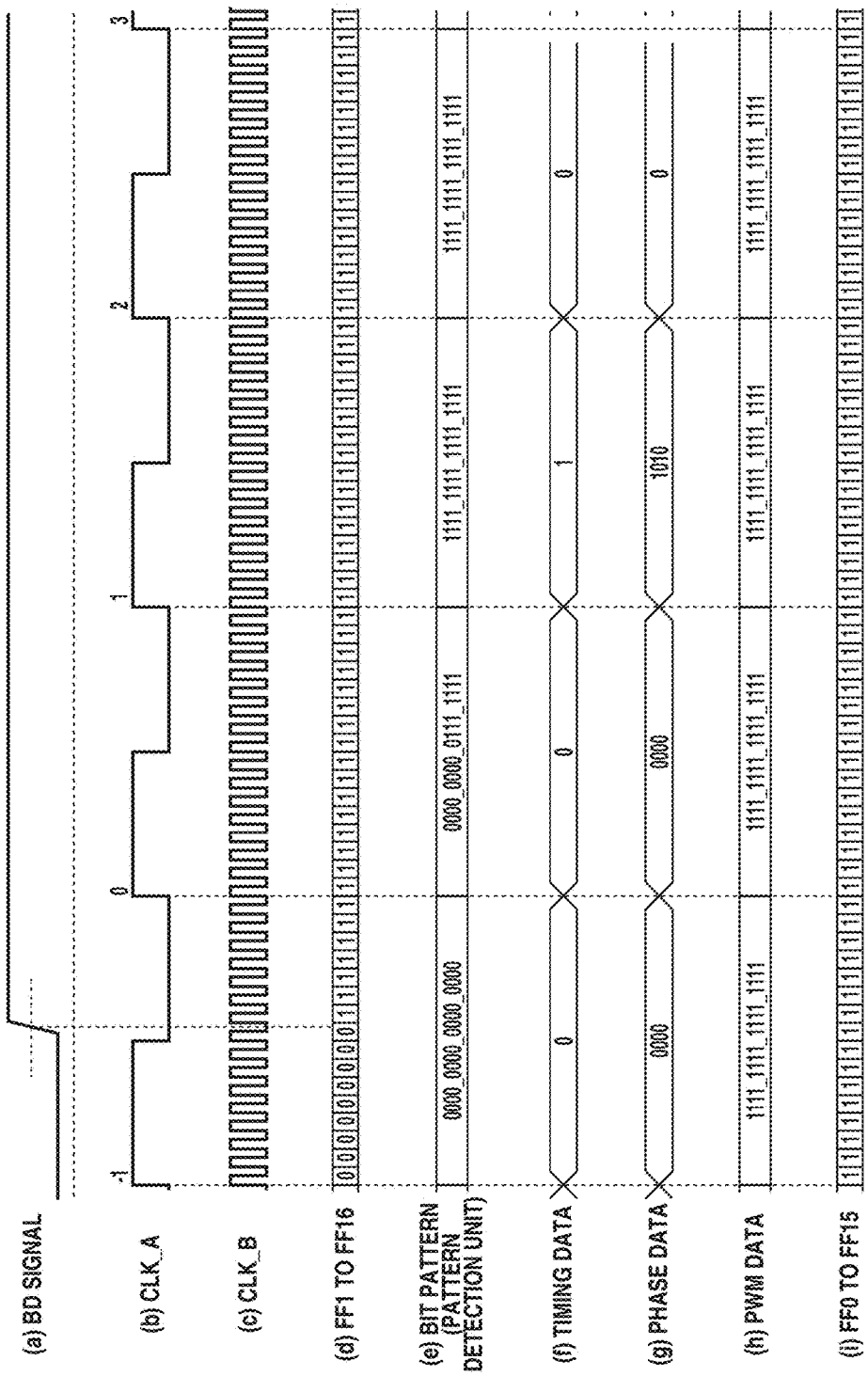
FIG. 9 is a timing chart illustrating processing performed by the controller.

The pattern detection unit 404 will be described below. FIG. 9 is a timing chart illustrating data processing performed by the controller 403 when laser light enters the BD 203. Referring to FIG. 9, (a) indicates the BD signal as an analog signal, (b) indicates the clock signal CLK_A, (c) indicates the clock signal CLK_B, (d) indicates the BD bit pattern latched by the FF 1 to FF 16 in one cycle of the clock signal CLK_A, (e) indicates the BD bit pattern acquired from the FF 1 to FF 16 by the pattern detection unit 404 in synchronization with the clock signal CLK_A, (f) indicates the timing data output by the pattern detection unit 404, (g) indicates the phase data output by the pattern detection unit 404, (h) indicates the PWM bit pattern parallelly input from the data processing unit 406 to the FF 0 to FF 15 in synchronization with the clock signal CLK_A, and (i) indicates the PWM bit pattern, before the shift operation in synchronization with the clock signal CLK_B, input from the data processing unit 406 to the FF 0 to FF 15 in synchronization with the clock signal CLK_A.

The pattern detection unit 404 generates timing data and phase data based on the BD bit pattern acquired from the FF 1 to FF 16. There is no synchronous relation between the generation cycle of a change point of the BD signal and the clock signal CLK_A. Therefore, as indicated by (a) in FIG. 9, the BD signal may be activated in one cycle of the clock signal CLK_A.

In the image forming apparatus using a light scanning apparatus, the image writing start position in the main scanning direction in each scanning cycle is adjusted by controlling the output timing of the PWM signal from the controller with reference to the BD signal. The controller controls the output timing of the PWM signal by using the clock signal.

The rotational speed of the polygon mirror 202 minutely fluctuates, and the processing accuracy of the reflection surface of the polygon mirror 202 has a limitation. Therefore, the rising cycle of the BD signal minutely fluctuates in each scanning cycle. On the other hand, the clock signal CLK_A is generated at fixed intervals. More specifically, there is no synchronous relation between the cycle of the rising timing of the BD signal illustrated in FIG. 9A and the clock signal CLK_A. Therefore, the rising timing of the BD signal may change with a resolution lower than the cycle of the clock signal CLK_A in each scanning cycle. Although the controller can determine a change of the rising timing of the BD signal generated with a resolution equal to or higher than the cycle of the clock signal CLK_A, the controller cannot determine a change of the rising timing of the BD signal generated with a resolution lower than the cycle of the clock signal CLK_A.

It is assumed that the detection accuracy of the BD signal in each scanning cycle is improved by further increasing the frequency of the clock signal CLK_A. However, when all of internal modules of the controller are operated by a high-frequency clock signal, a problem of an increase in the circuit scale of the controller and an increase in the power consumption will arise.

The control unit according to the present exemplary embodiment includes the shift register 403 and the pattern detection unit 404 as internal modules, and uses the clock signal CLK_A together with the clock signal CLK_B having a higher frequency than that of the clock signal CLK_A to ensure the detection accuracy of the BD signal.

(Timing Charts)

As indicated by (a), (c), and (d) in FIG. 9, in one cycle of the clock signal CLK_A (CLK_A-1), the BD signal exceeds a threshold value between the 9th and 10th pulses of the clock signal CLK_B. Therefore, a BD bit pattern (0000000001111111) sampled in synchronization with the clock signal CLK_B is latched by the FF 1 to FF 16 of the shift register 403. Then, the pattern detection unit 404 parallelly acquires the 16-bit BD bit pattern (0000000001111111) latched by the FF 1 to FF 16 of the shift register 403 in synchronization with next clock signal CLK_A (CLK_A0).

The pattern detection unit 404 determines whether the acquired BD bit pattern includes a change point where the bit data changes from 0 to 1. Since the BD bit pattern acquired in synchronization with the clock signal CLK_A0 includes a change point where the bit data changes from 0 to 1, the pattern detection unit 404 outputs timing data (1) and phase data (1010) in synchronization with the next clock signal CLK_A1, as indicated by (f) and (g) in FIG. 9.

The timing data (1) indicates the generation timing of a change point (rising edge) of the BD signal in each cycle of the clock signal CLK_A. The phase data (1010) indicates the generation timing of a change point (rising edge) of the BD signal in each cycle of the clock signal CLK_B. The phase data (1010) is a 4-bit binary bit pattern which indicates that the BD signal has changed between the 9th and the 10th pulses of the clock signal CLK_B in one cycle of the clock signal CLK_A. When a change point (rising edge) of the BD signal does not occur for each cycle of the clock signal CLK_A, as indicated by (f) and (g) in FIG. 9, the pattern detection unit 404 generates timing data (0) and phase data (0000).

PWM data needs to emit a light beam emit to activate the BD signal. Therefore, as indicated by (h) in FIG. 9, the data processing unit 406 sets a 16-bit PWM bit pattern (1111111111111111) as PWM data in synchronization with the clock signal CLK_A. The 16-bit PWM bit pattern (1111111111111111) is input to the FF 0 to FF 15 of the shift register 403 in synchronization with the clock signal CLK_A. Then, in synchronization with the clock signal CLK_B, the shift register 403 outputs the PWM bit data latched by the FF 0 and shifts the PWM bit data latched by the FF 1 to FF 15 to adjacent FFs on the downstream side.

Figure 10:
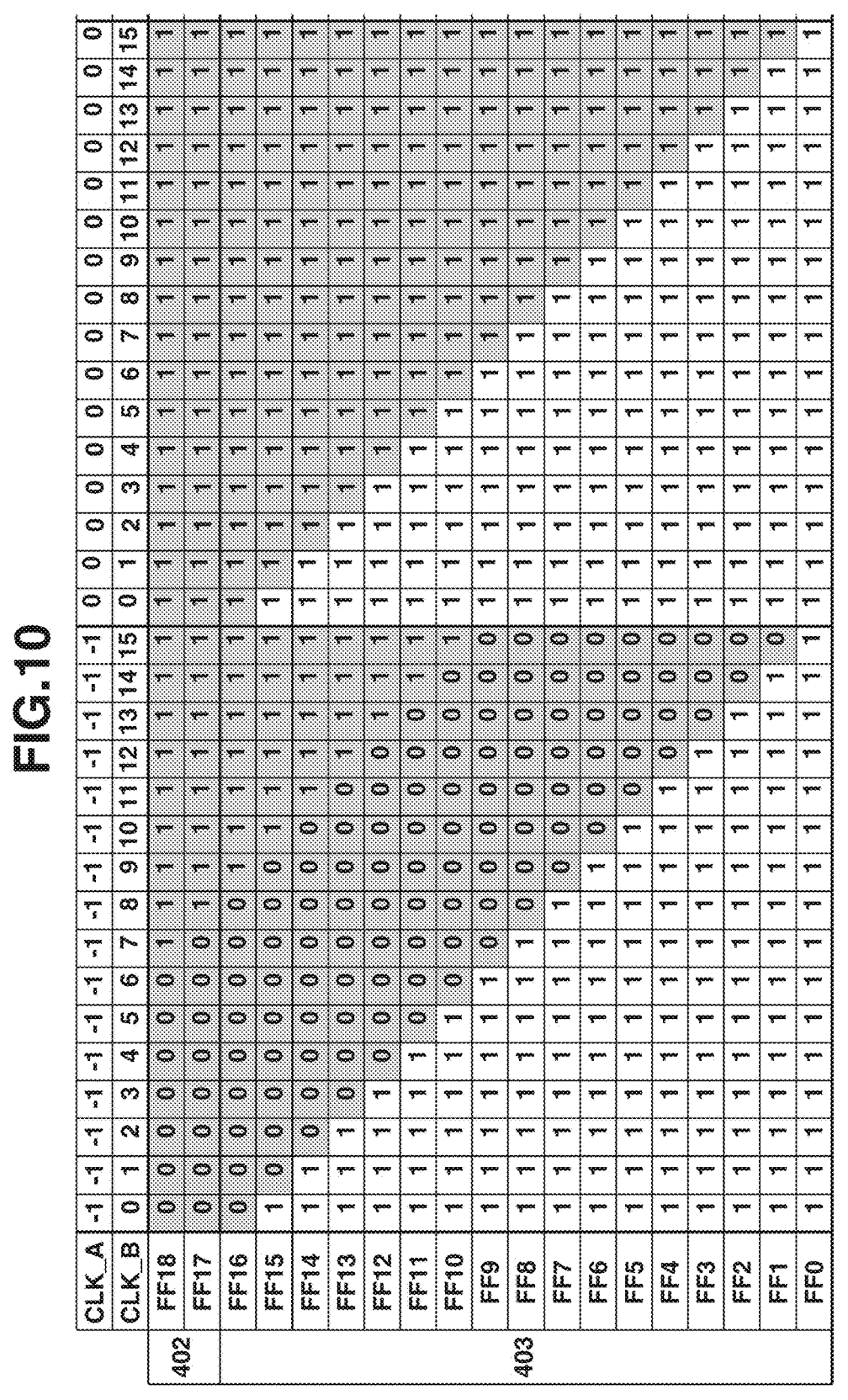

FIG. 10 is a table illustrating shift operations of the shift register 403 in the cycles of the clock signal CLK_A-1 and the clock signal CLK_A0 illustrated in FIG. 9. Referring to FIG. 10, shaded squares indicate the BD bit data as a result of sampling the BD signal, and white squares indicate PWM bit data for generating the PWM signal. As illustrated in FIG. 10, in synchronization with the clock signal CLK_A-1, the 16-bit PWM bit pattern (1111111111111111) is input from the data processing unit 406 to the FF 0 to FF 15. At this timing, BD bit data is latched by the FF 17 and FF 18 of the buffer unit 402 and the FF 16 of the shift register 403. In this state, in synchronization with the clock signal CLK_B, the bit data of the FF 0 to FF 16 of the shift register 403 and the FF 17 and FF 18 of the buffer unit 402 shift by one bit to adjacent FFs on the downstream side. The bit data of the FF 0 located on the most downstream side is serially output to the laser driver 307 as a PWM signal.

Referring to FIG. 10, in synchronization with the clock signal CLK_B9 in the cycle of the clock signal CLK_A-1, the BD bit data (1) indicating the rising edge of the BD signal is input to the FF 16 of the shift register 403. Since the High state of the BD signal subsequently continues, the bit data (1) is continuously kept being input to the FF 16 of the shift register 403.

Referring to FIG. 10, in the cycle of the clock signal CLK_B15 in the cycle of the clock signal CLK_A-1, the BD bit pattern (0000000001111111) as the BD signal is latched by the FF1 to FF 16. Then, in synchronization with the pulse next to the clock signal CLK_B, i.e., the clock signal CLK_A0, the pattern detection unit 404 acquires the BD bit pattern (0000000001111111) to the FF 1 to FF 16. In synchronization with the clock signal CLK_B0 in the cycle of the clock signal CLK_A0, the PWM bit data latched by the FF 0 is output from the FF 0. In synchronization with the clock signal CLK_A0, the PWM bit pattern (1111111111111111) is input from the data processing unit 406 to the FF 0 to FF 15 of the shift register 403.

Figure 11:
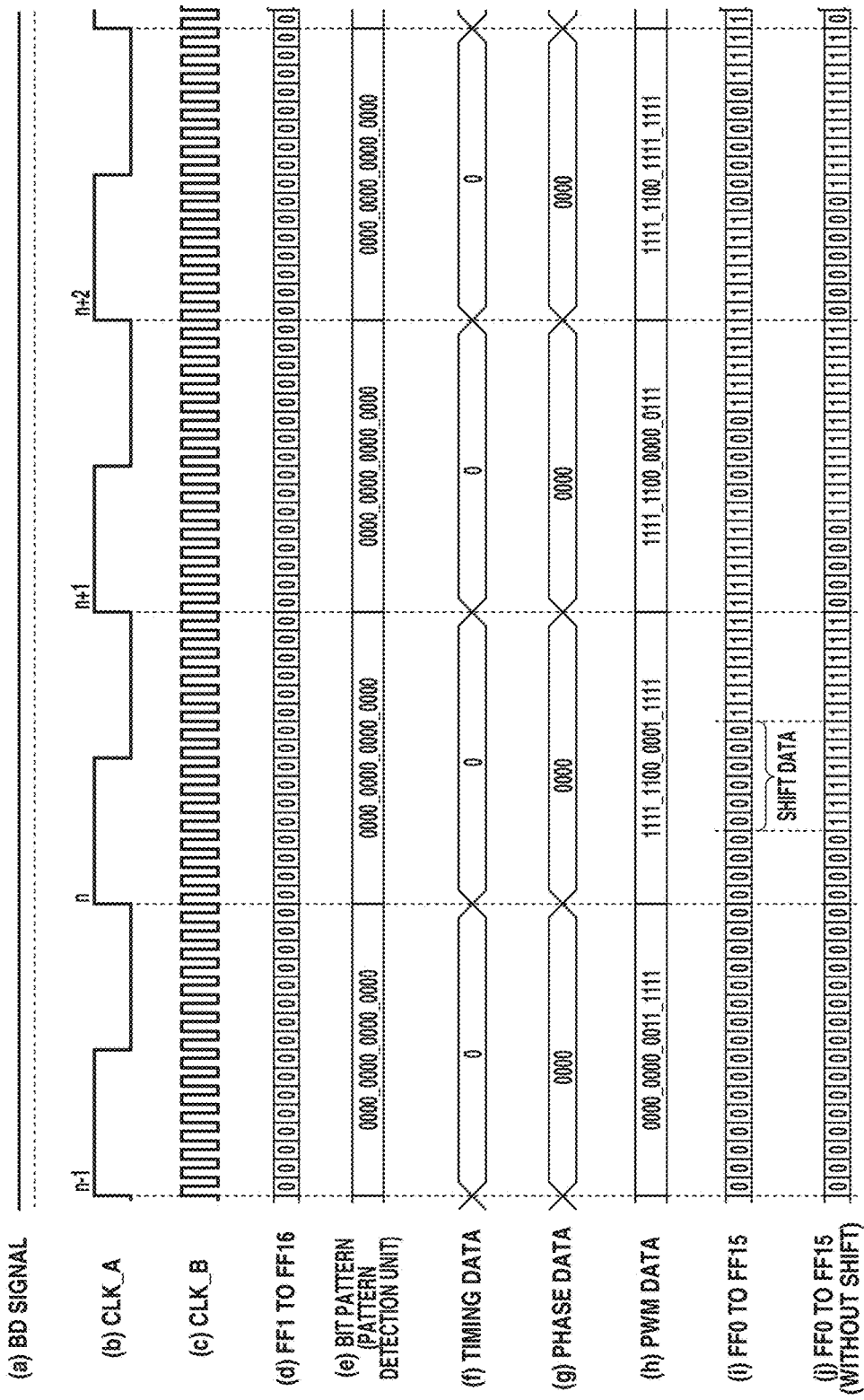
FIG. 11 is a timing chart illustrating processing performed by the controller.
Figure 12:
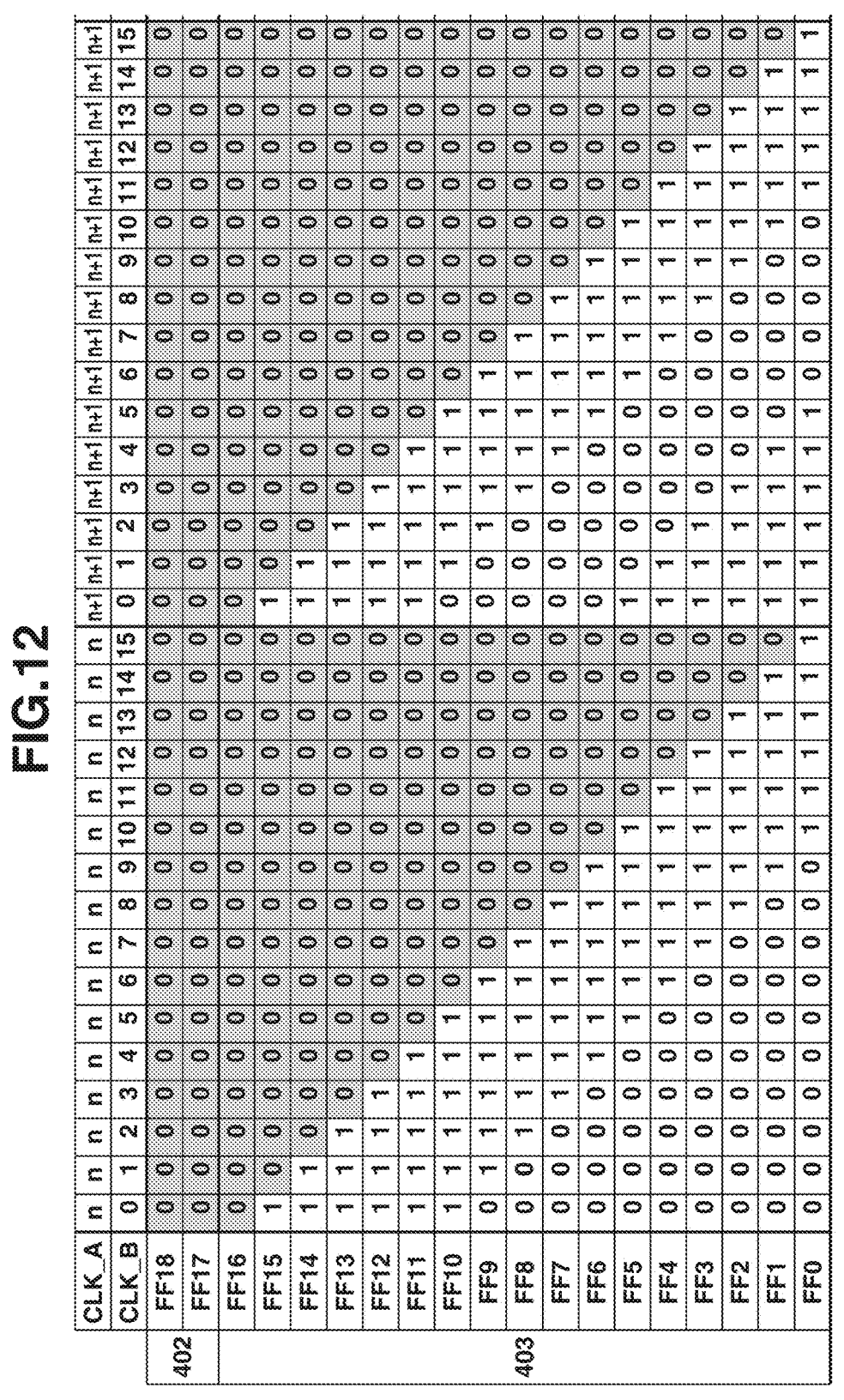

The following describes, with reference to FIGS. 11 and 12, data processing performed by the controller 403 at the timing of scanning the image writing start position in the main scanning direction by laser light. Referring to FIG. 11, (a) to (i) indicate the same signal and data as (a) to (i) in FIG. 9.

As indicated by (a) in FIG. 11, the BD signal remains unchanged because laser light does not enter the BD 203 at the timing when laser light scans the image writing start position in the main scanning direction. Therefore, the data latched by the FF 1 to FF 16 indicated by (d) in FIG. 11 is (0), and the BD bit pattern acquired by the pattern detection unit 404 is also (0000000000000000). Then, the timing data and phase data output by the pattern detection unit 404 are (0) and (0000), respectively.

On the other hand, in synchronization with the (n−1)-th pulse of the clock signal CLK_A, the data processing unit 406 sets a PWM bit pattern (0000111111111111) as a result of the PWM data shift processing (described below). Then, in synchronization with the next n-th pulse of the clock signal CLK_A, the PWM bit pattern (0000111111111111) is input to the FF 0 to FF 15 of the shift register 403. In the cycle of the n-th pulse of the clock signal CLK_A, the shift register 403 outputs one bit of the PWM bit data from the FF 0 in synchronization with the clock signal CLK_B. In the cycle of the n-th pulse of the clock signal CLK_A, the shift register 403 shifts the bit data latched by the FF 1 to FF 16 in synchronization with the clock signal CLK_B. Further, in the cycle of the n-th pulse of the clock signal CLK_A, one bit of the BD bit data is input from the buffer unit 402 to the FF 16 in synchronization with the clock signal CLK_B15.

FIG. 12 illustrates a table indicating shift operations of the shift register 403 in the cycle of the n-th pulse of the clock signal CLK_A and the (n+1)-th pulse of the clock signal CLK_A illustrated in FIG. 11. Similar to FIG. 10, in the table illustrated in FIG. 12, shaded squares are BD data generated when the BD signal is sampled and white squares are PWM data for generating a PWM signal. As illustrated in FIG. 10, in synchronization with the n-th pulse of the clock signal CLK_A, a 16-bit PWM bit pattern (0000000000111111) is input from the data processing unit 406 to the FF 0 to FF 15. At this timing, the BD bit data (0) is latched by the FFs 17 and 18 of the buffer unit 402, and the FF 16 of the shift register 403. In this state, in synchronization with the clock signal CLK_B, the BD bit data of the FF 0 to FF 16 of the shift register 403 and the FFs 17 and 18 of the buffer unit 402 shift by 1 bit to adjacent FFs on the downstream side. The bit data of the FF 0 located on the most downstream side is output to the laser driver 307 as a PWM signal.

Referring to FIG. 12, a BD bit pattern (0000000000000000) is latched by the FF1 to FF 16 in the cycle of the clock signal CLK_B15 in the cycle of the n-th pulse of the clock signal CLK_A. Then, in synchronization with the next pulse of the clock signal CLK_B, i.e., the clock signal CLK_B0 in the cycle of the (n+1)-th pulse of the clock signal CLK_A, the pattern detection unit 404 acquires the BD bit pattern (0000000000000000) from the FF 1 to FF 16. In synchronization with the clock signal CLK_B0 in the cycle of the (n+1)-th pulse of the clock signal CLK_A, the PWM data (bit data) latched by the FF 0 is output from the FF 0. Further, in synchronization with the clock signal CLK_B0 in the cycle of the (n+1)-th pulse of the clock signal CLK_A, a PWM bit pattern (1111110000011111) is input to the FF 0 to FF 15 of the shift register 403 from the data processing unit 406.

(Shift Processing of Data Processing Unit)

PWM bit data shift processing of the data processing unit 406 will be described below. Based on the timing data input from the calculation unit 405, the data processing unit 406 selects a pulse of the clock signal CLK_A for inputting to the FF 0 to FF 15 the 16-bit PWM bit pattern corresponding to the image writing start position in the main scanning direction. Then, in synchronization with the (n+1)-th pulse of the clock signal CLK_A based on the timing data, the data processing unit 406 outputs the 16-bit PWM bit pattern corresponding to the image writing start position in the main scanning direction. This enables adjusting the writing start position in units of cycle of the clock signal CLK_A.

The data processing unit 406 further generates shift data based on the phase data to adjust the image writing start position in units of cycle of the clock signal CLK_B. (j) in FIG. 11 is a comparative example indicating a case where PWM bit data shift processing in units of cycle of the clock signal CLK_B is not performed. For the PWM bit pattern indicated by (j) in FIG. 11, 6-bit shift data is inserted into the PWM bit pattern indicated by (i) in FIG. 11. This shift data is generated by the data processing unit 406 based on the phase data to correct the writing start position for 6 cycles of the clock signal CLK_B. This enables adjusting the writing start position in units of cycle of the clock signal CLK_B.

As described above, in the image forming apparatus according to the present exemplary embodiment, the shift register 403 can perform both serial-to-parallel conversion on the BD bit pattern and parallel-to-serial conversion on the PWM bit pattern. This enables reducing the circuit scale in comparison with conventional image forming apparatuses which perform serial-to-parallel conversion on the BD bit pattern and parallel-to-serial conversion on the PWM bit pattern by using different shift registers.

According to one aspect of the embodiments, it is possible to adjust the image writing start position by using a common shift register for performing serial-to-parallel conversion on the BD signal and parallel-to-serial conversion on a bit pattern that is image data.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2016-097160, filed May 13, 2016, which is hereby incorporated by reference herein in its entirety.

What is claimed is:

1. A data processing apparatus included in an image forming apparatus, the image forming apparatus comprising a photosensitive member, a light source configured to emit a light beam, a deflection unit configured to deflect the light beam so that the light beam scans a surface of the photosensitive member, a photoelectric conversion element configured to receive the light beam deflected by the deflection unit and configured to output a photoelectric conversion signal in response to a reception of the light beam, and a drive unit configured to drive the light source based on a drive signal generated based on image data, the data processing apparatus comprising:

a shift register including a plurality of flip-flops cascade-connected, configured to receive a first clock signal and operate in response to the first clock signal, and configured to shift and serially output latched bit data in a cycle of the first clock signal;

a first input unit configured to receive the first clock signal and operate in response to the first clock signal, configured to generate bit data by sampling output of the photoelectric conversion signal in the cycle of the first clock signal, and configured to serially input the bit data, obtained by sampling output of the photoelectric conversion signal, to the shift register in the cycle of the first clock signal;

an acquisition unit configured to receive a second clock signal of which a cycle is N times of the cycle of the first clock signal (N is a positive integer larger than 1) and operate in response to the second clock signal, and configured to parallelly acquire a first bit pattern, latched by the shift register as a result of shifting the bit data input from the first input unit by the shift register, in the cycle of the second clock signal;

a processing unit configured to perform correction processing on image data for adjusting an image writing start position in a scanning direction of the light beam based on the first bit pattern acquired by the acquisition unit; and a second input unit configured to receive the second clock signal and operate in response to the second clock signal, and configured to parallelly input a second bit pattern, as the image data processed by the processing unit in synchronization with an acquisition of the first bit pattern by the acquisition unit, to the shift register in the cycle of the second clock signal, wherein, the shift register serially outputs the bit data included in the input second bit pattern from a flip-flop on a most downstream side in synchronization with the first clock signal to generate the drive signal.

2. The data processing apparatus according to claim 1, further comprising an output unit configured to output timing data indicating a timing when the acquisition unit has acquired the first bit pattern including a bit data change point and configured to output phase data indicating a position of the bit data change point in the first bit pattern, wherein, based on the timing data, the processing unit controls a timing of inputting to the shift register the second bit pattern obtained through processing based on the phase data.

3. The data processing apparatus according to claim 1, wherein the first input unit inputs bit data obtained by sampling in the cycle of the first clock signal output of the photoelectric conversion signal from a flip-flop located on a most upstream side out of the flip-flops disposed in the shift register in a bit data shift direction, and wherein the shift register outputs the bit data included in the second bit pattern from a flip-flop located on a most downstream side out of the flip-flops disposed in the shift register in the bit data shift direction.

4. The data processing apparatus according to claim 1, wherein the first and the second bit patterns are N bit data streams, and wherein the shift register is an (N+1)-bit shift register.

5. The data processing apparatus according to claim 4, wherein the acquisition unit acquires the first bit pattern from N flip-flops on the upstream side out of N+1 flip-flops of the (N+1)-bit shift register in the data shift direction, and wherein the second input unit inputs the second bit pattern to N flip-flops on the downstream side out of N+1 flip-flops of the (N+1)-bit shift register in the data shift direction.

6. An image forming apparatus comprising:
a photosensitive member;
a light source configured to emit a light beam;
a deflection unit configured to deflect the light beam so that the light beam scans a surface of the photosensitive member;
a photoelectric conversion element configured to receive the light beam deflected by the deflection unit and output a photoelectric conversion signal in response to a reception of the light beam;
a drive unit configured to drive the light source based on a drive signal generated based on image data; and
a clock signal generation unit configured to generate a first clock signal and a second clock signal of which a cycle is N times of the cycle of the first clock signal (N is a positive integer larger than 1);
a data processing apparatus configured to operate in response to the first clock signal and the second clock signal,
wherein the data processing apparatus comprises:
a shift register including a plurality of flip-flops cascade-connected, configured to receive the first clock signal and operate in response to the first clock signal, and configured to shift and serially output latched bit data in a cycle of the first clock signal;
a first input unit configured to receive the first clock signal and operate in response to the first clock signal, configured to generate bit data by sampling output of the photoelectric conversion signal in the cycle of the first clock signal, and configured to serially input the bit data, obtained by sampling output of the photoelectric conversion signal, to the shift register in the cycle of the clock signal;
an acquisition unit configured to receive the second clock signal and operate in response to the second clock signal, and configured to parallelly acquire a first bit pattern, latched by the shift register as a result of shifting the bit data input from the first input unit by the shift register, in the cycle of the clock signal;
a processing unit configured to perform processing on image data for adjusting an image writing start position in a scanning direction of the light beam based on the first bit pattern acquired by the acquisition unit; and
a second input unit configured to receive the second clock signal and operate in response to the second clock signal, and configured to parallelly input a second bit pattern, as the image data processed by the processing unit in synchronization with an acquisition of the first bit pattern by the acquisition unit, to the shift register in the cycle of the second clock signal, and
wherein, the shift register serially outputs the bit data included in the input second bit pattern from a flip-flop on a most downstream side in synchronization with the first clock signal to generate the driver signal.

7. The image forming apparatus according to claim 6, further comprising an output unit configured to output timing data indicating a timing when the acquisition unit acquired the first bit pattern including a bit data change point and configured to output phase data indicating a position of the bit data change point in the first bit pattern, wherein, based on the timing data, the processing unit controls a timing of inputting to the shift register the second bit pattern obtained through processing based on the phase data.

8. The image forming apparatus according to claim 6,
wherein the first input unit inputs bit data obtained by sampling in the cycle of the first clock signal output of the photoelectric conversion signal from a flip-flop located on a most upstream side out of the flip-flops disposed in the shift register in a bit data shift direction, and
wherein the shift register outputs the bit data included in the second bit pattern from a flip-flop located on a most downstream side out of the flip-flops disposed in the shift register in the bit data shift direction.

9. The image forming apparatus according to claim 6,
wherein the first and the second bit patterns are N bit data streams, and
wherein the shift register is an (N+1)-bit shift register.

10. The image forming apparatus according to claim 9,
wherein the acquisition unit acquires the first bit pattern from N flip-flops on the upstream side out of N+1 flip-flops of the (N+1)-bit shift register in the data shift direction, and
wherein the second input unit inputs the second bit pattern to N flip-flops on the downstream side out of N+1 flip-flops of the (N+1)-bit shift register in the data shift direction.

11. The data processing apparatus according to claim 1, further comprising a clock signal generation unit configured to generate the first and the second clock signals.

12. The data processing apparatus according to claim 11, wherein the clock signal generation unit frequency-multiplies the first clock signal to generate the second clock signal.

13. The data processing apparatus according to claim 12, wherein a frequency-multiplication number of the first clock signal to the second clock signal coincides with the number of bits in the bit pattern.

14. The data processing apparatus according to claim 11, wherein the clock signal generation unit frequency-divides the second clock signal to generate the first clock signal.

15. The image forming apparatus according to claim 6, wherein the clock signal generation unit frequency-multiplies the first clock signal to generate the second clock signal.

16. The image forming apparatus according to claim 15, wherein a frequency-multiplication number of the first clock signal to the second clock signal coincides with the number of bits in the bit pattern.

17. The image forming apparatus according to claim 6, wherein the clock signal generation unit frequency-divides the second clock signal to generate the first clock signal.

* * * * *